United States Patent [19]

Wang

[11] Patent Number: 5,193,830
[45] Date of Patent: Mar. 16, 1993

[54] CARRIER FOR A BICYCLE WITH REMOVABLE EXTENSIONS

[76] Inventor: Tarrassa Wang, 2nd Fl., No. 20-1, Alley 6, Lane 670, Taya Rd., Taichung, Taiwan

[21] Appl. No.: 801,440
[22] Filed: Dec. 2, 1991
[51] Int. Cl.⁵ .............................. B62J 7/00; B62J 1/28
[52] U.S. Cl. .................................. 280/202; 297/464; 224/32 A; 224/30 R
[58] Field of Search ............... 280/202; 297/464, 467, 297/216; D6/333; 224/30 R, 32 A

[56] References Cited

U.S. PATENT DOCUMENTS 3,743,321 7/1973 Luschen et al. ............... 280/202
4,053,091 10/1977 Martelet ........................ 280/202 X

FOREIGN PATENT DOCUMENTS 2644127 9/1990 France ........................... 280/202

Primary Examiner—Margaret A. Focarino
Assistant Examiner—Kevin Hurley
Attorney, Agent, or Firm—Fitch, Even, Tabin & Flannery

[57] ABSTRACT

A carrier for a bicycle including a body having two pairs of dovetails formed on a lower and front portion, and two extensions each having a pair of dovetail slots formed in an upper portion for engagement with the dovetails of the body so that the extensions can be coupled to the body, and the extensions can be disengaged from the body so that volume of the carrier can be decreased.

3 Claims, 5 Drawing Sheets

CARRIER FOR A BICYCLE WITH REMOVABLE EXTENSIONS

BACKGROUND OF THE INVENTION

1. Field of the Invention

The present invention relates to a carrier, and more particularly to a carrier for a bicycle.

2. Description of the Prior Art

In order to carry a baby or a child by a bicycle, various kinds of carriers are developed and disposed on the rear portion of the bicycle. The carriers are generally integrally formed and occupy a large volume when they are packaged. This greatly increases the transportation fee thereof.

The present invention has arisen to mitigate and/or obviate the afore-described disadvantages of the conventional carriers for bicycles.

SUMMARY OF THE INVENTION

The primary objective of the present invention is to provide a carrier in which part of the carrier can be separated and disengaged, and can be easily assembled so that the carrier occupies a relatively small space when packaged.

In accordance with one aspect of the invention, there is provided a carrier for a bicycle including a body having two pairs of dovetails formed on a lower and front portion, and two extensions each having a pair of dovetail slots formed in an upper portion for engagement with the dovetails of the body so that the extensions can be coupled to the body, and the extensions can be disengaged from the body so that volume of the carrier can be decreased.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
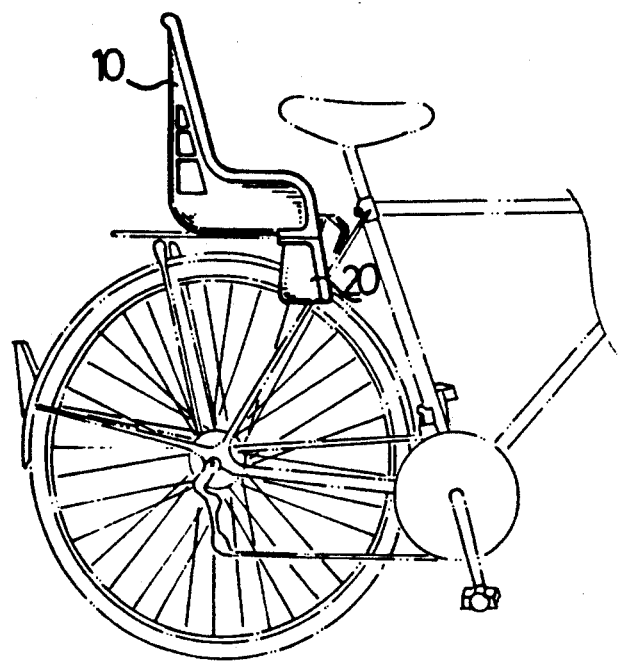
FIG. 1 is a plane side view of a bicycle on which a carrier in accordance with the present invention is disposed.
Figure 2:
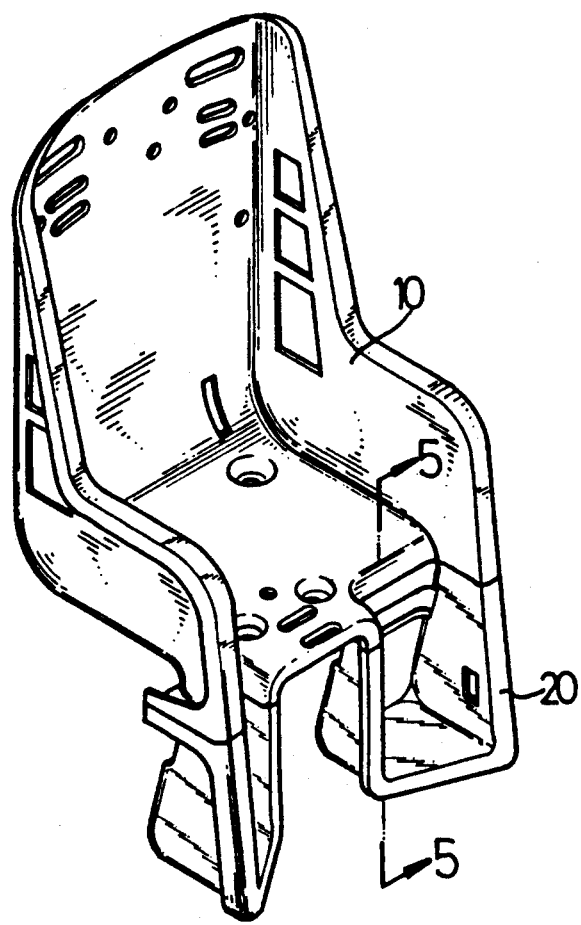
FIG. 2 is a perspective view of the carrier, in which the cover is removed from the carrier.
Figure 3:
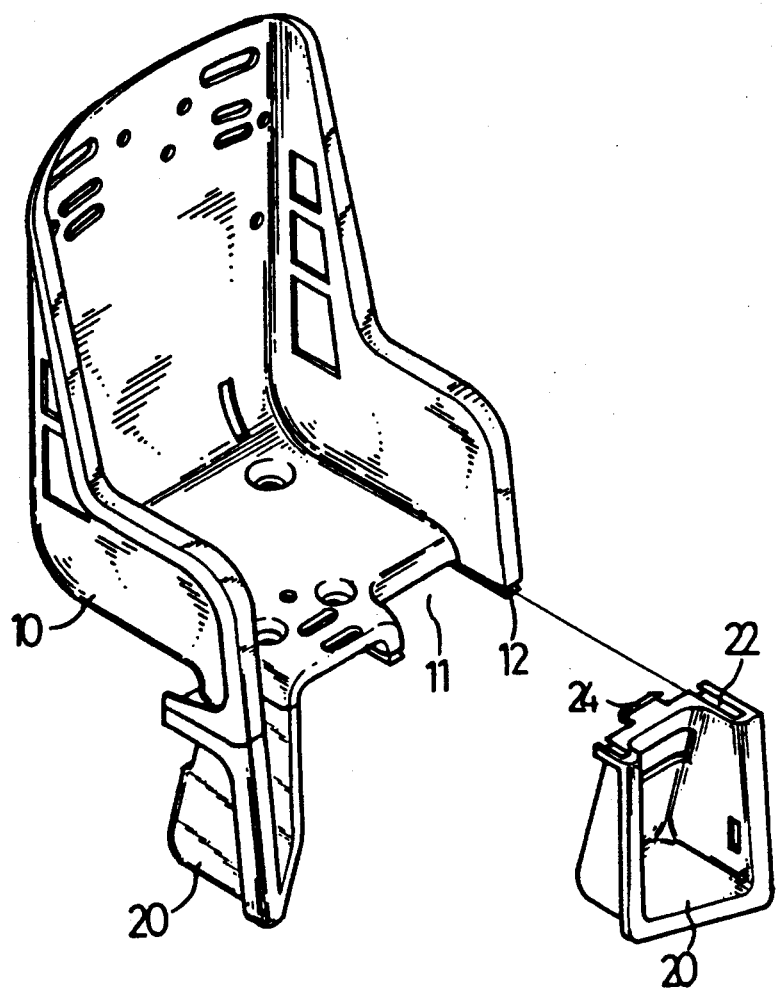
FIG. 3 is a partial exploded view of the carrier.
Figure 4:
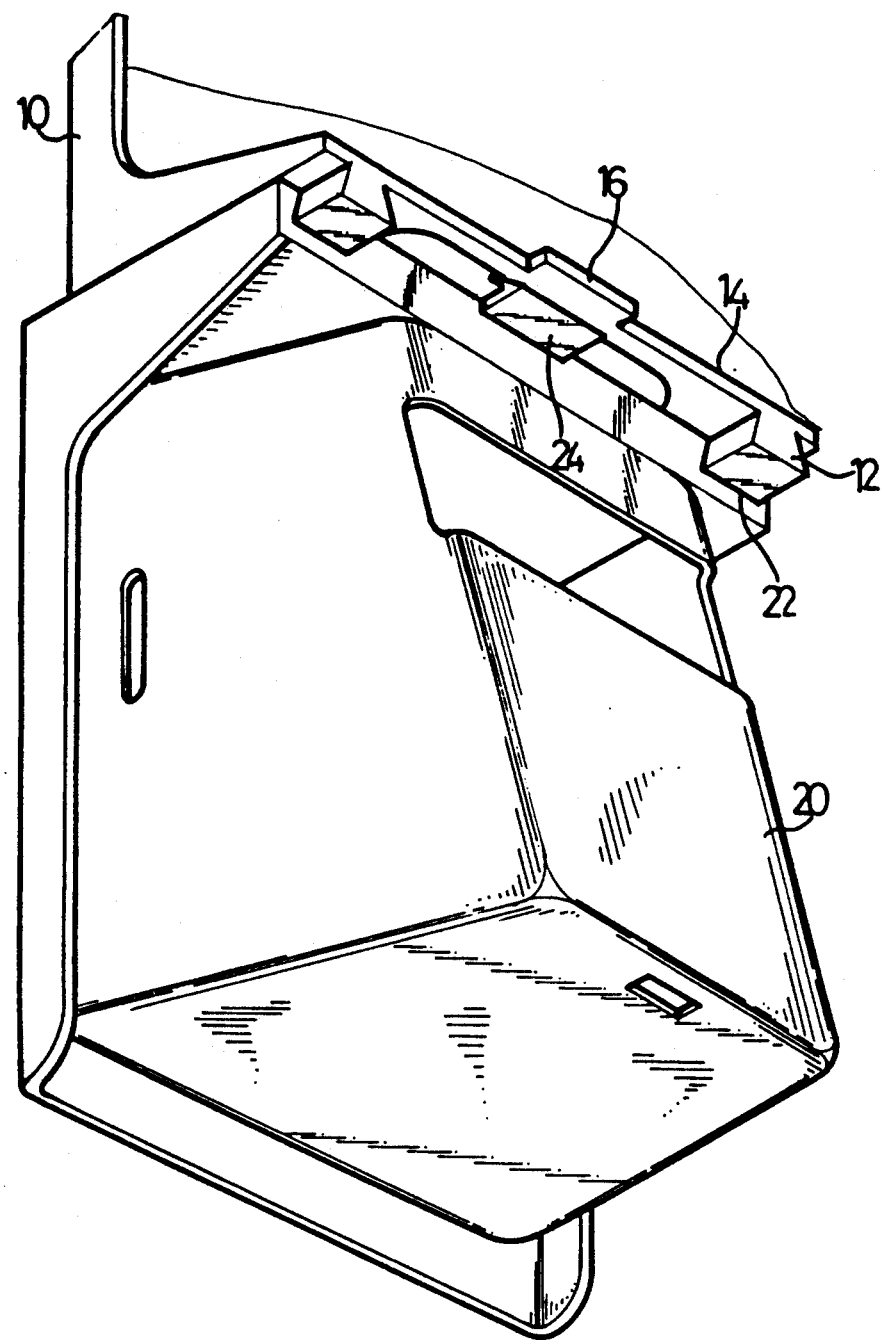
FIG. 4 is a rear view of part of the carrier, illustrating the engagement of the parts.
Figure 5:
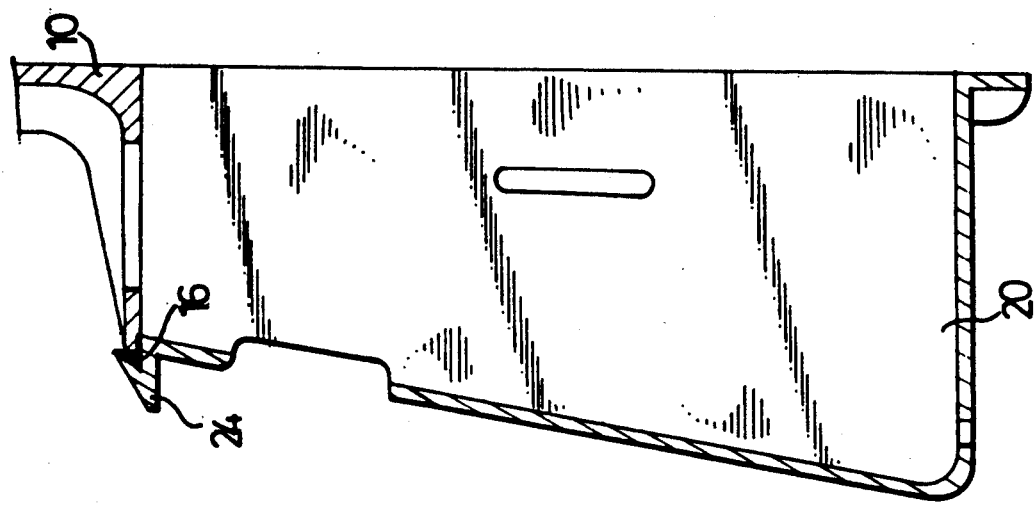
FIG. 5 is a cross sectional view taken along lines 5—5 of FIG. 2.

Referring to the drawings, a carrier in accordance with the present invention comprises generally a body 10 preferably covered by a cloth cover so as to form a seat portion on which a child and a baby can be seated, and two extensions 20 coupled to the lower portion of the body 10 so as to form two support portions on which the feet of the child can be rested and disposed. The extensions 20 can be coupled to the body 10 and can be disengaged from the body 10 so that the volume of the carrier can be decreased.

The body 10 has two U-shaped portions 11 formed on the lower and front portion of the body 10, each of the U-shaped portions 11 includes two side portions each having a dovetail 12 formed thereon and a rear portion having a flange 14 formed thereon. Each of the extensions 20 has a U-shaped upper portion, the U-shaped upper portion includes two side portions each having a dovetail slot 22 formed in the top thereof for engagement with the dovetails 12 of the body 10 so that the extensions 20 can be coupled to the body 10, and a rear portion having a hook 24 formed thereon. Each of the flanges 14 preferably has a protrusion 16 formed thereon. The hooks 24 of the extensions 20 can be engaged with the protrusions 16 when the dovetails 12 of the body 10 are engaged with the dovetail slots 22 of the extensions 20 so that the extensions 20 can further be retained in place.

The extensions 20 can be disengaged from the body 10 when the hooks 24 are disengaged from the protrusions 16, and the extensions 20 can be disposed in the body 10 when packaged so that the volume of the carrier can be greatly decreased. This is excellent for transportation purposes.

Alternatively, the dovetails can be formed on the upper portions of the extensions 20 and the dovetail slots can be formed in the bottom portion of the body 10 for engagement with the dovetails of the extensions 20 so that the extensions can also be coupled to the body 10.

Further alternatively, without the engagement between the hooks 24 and the protrusions 16, the dovetails 12 of the body 10 can be engaged with the dovetail slots 22 of the extensions 20 by such as force-fitted engagement so that the extensions 20 can also be retained in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrier for a bicycle comprising a body including two pairs of dovetails formed on a lower and front portion thereof, and two extensions each having a pair of dovetail slots formed in an upper portion thereof for engagement with said dovetails of said body so that said extensions can be coupled to said body; and said extensions can be disengaged from said body so that volume of said carrier can be decreased.

2. A carrier according to claim 1, wherein said body includes two flanges formed on said lower and front portion thereof, each of said extensions includes a hook formed on said upper portion thereof and engageable with said flange of said body when said dovetails are engaged with said dovetail slots so that said extensions can further be coupled to said body.

3. A carrier for a bicycle comprising a body including two first U-shaped portions formed on a lower and front portion thereof, each of said first U-shaped portions including two side portions each having a dovetail formed on a bottom thereof and a rear portion having a flange formed thereon; and two extensions each including a second U-shaped portion formed on an upper portion thereof, said second U-shaped portion including two side portions each having a dovetail slot formed in an upper portion thereof for engagement with said dovetails of said body so that said extensions can be coupled to said body, and a rear portion having a hook formed thereon, said hooks being engageable with said flanges of said body so that said extensions can further be coupled to said body; and said extensions can be disengaged from said body so that volume of said carrier can be decreased.

* * * * *

UNITED STATES PATENT AND TRADEMARK OFFICE
CERTIFICATE OF CORRECTION

PATENT NO. : 5,193,830

DATED : March 16, 1993

INVENTOR(S) : Tarrassa WANG

It is certified that error appears in the above-identified patent and that said Letters Patent is hereby corrected as shown below:

Column 1, line 40, change "plane side view" to read --side view--.

Signed and Sealed this

Thirtieth Day of November, 1993

Attest:

Attesting Officer

BRUCE LEHMAN

Commissioner of Patents and Trademarks